(12) United States Patent
Cho et al.

(10) Patent No.: US 10,769,085 B2
(45) Date of Patent: Sep. 8, 2020

(54) BUS SYSTEM

(71) Applicant: SAMSUNG ELECTRONICS CO., LTD., Suwon-si, Gyeonggi-Do (KR)

(72) Inventors: Joon-Woo Cho, Seoul (KR); Yun Ju Kwon, Yongin-si (KR); Sang Woo Kim, Suwon-si (KR); Woo-Jin Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/943,647

(22) Filed: Apr. 2, 2018

(65) Prior Publication Data

US 2019/0102332 A1   Apr. 4, 2019

(30) Foreign Application Priority Data

Sep. 29, 2017   (KR) .......................... 10-2017-0127286

(51) Int. Cl.

| | |
|---|---|
| *G06F 11/07* | (2006.01) |
| *G06F 13/362* | (2006.01) |
| *G06F 13/16* | (2006.01) |
| *G06F 13/10* | (2006.01) |
| *G06F 11/30* | (2006.01) |

(52) U.S. Cl.
CPC ........ *G06F 13/362* (2013.01); *G06F 11/0745* (2013.01); *G06F 11/0793* (2013.01); *G06F 13/10* (2013.01); *G06F 13/1652* (2013.01); *G06F 13/1668* (2013.01); *G06F 11/0721* (2013.01); *G06F 11/3027* (2013.01)

(58) Field of Classification Search
CPC .... G06F 13/364; G06F 13/14; G06F 11/2027; G06F 11/0745; G06F 11/0793; G06F 11/3027; G06F 13/362
See application file for complete search history.

(56) References Cited

U.S. PATENT DOCUMENTS

| | | | |
|---|---|---|---|
| 6,985,980 B1 | 1/2006 | Allegrucci | |
| 7,251,755 B2 | 7/2007 | Joshi et al. | |
| 7,685,473 B2 | 3/2010 | Oshida | |
| 7,866,560 B2 | 1/2011 | Woodhouse et al. | |
| 8,656,220 B2 | 2/2014 | Lee et al. | |
| 9,529,686 B1 | 12/2016 | Arbel et al. | |
| 2007/0240019 A1 | 10/2007 | Brady et al. | |
| 2015/0355989 A1* | 12/2015 | Hayden | G06F 13/4027 714/56 |

FOREIGN PATENT DOCUMENTS

| | | |
|---|---|---|
| JP | 2010003268 A | 1/2010 |
| KR | 20110124617 | 11/2011 |

* cited by examiner

*Primary Examiner* — Ernest Unelus
(74) *Attorney, Agent, or Firm* — Volentine, Whitt & Francos, PLLC

(57) ABSTRACT

A bus system is provided. A bus system includes a slave functional block and a master functional block. The master functional block transmits a first command to the slave functional block. The slave functional block includes a first bus protector. The first bus protector receives the first command on behalf of the slave functional block and transmits a dummy signal corresponding to the first command to the master functional block in response to the slave functional block being in a state of not being able to receive the first command or not being able to transmit a response signal corresponding to the first command.

19 Claims, 13 Drawing Sheets

BUS SYSTEM

This U.S. non-provisional patent application claims the benefit of priority under 35 U.S.C. § 119 to Korean Patent Application No. 10-2017-0127286, filed on Sep. 29, 2017 in the Korean Intellectual Property Office, the disclosure of which is incorporated herein by reference in its entirety.

BACKGROUND

1. Technical Field

The present disclosure relates to a bus system.

2. Description of the Related Art

A System-on-Chip (SoC) is a chip on which multiple functional blocks are integrated. The multiple functional blocks may include, for example, one or more Intellectual Property blocks (IP blocks), and may each perform different functions. Use of SoCs has become commonplace. A bus system for transmitting commands and data between the functional blocks on the chip of the SoC is embedded in the SoC, and may be considered to include the functional blocks.

Conventionally, when the operation of one of the functional blocks on the SoC is stopped because of a problem, the problem may only be addressed by resetting the entire SoC. Thus, the need for a technique of resetting only the functional block that is problematic without affecting other parts of the SoC has arisen.

SUMMARY OF THE INVENTIVE CONCEPT

Some embodiments of the present disclosure provide a method of clearing commands that remain in a bus system, in response to the operation of a functional block in the bus system being stopped. Clearing commands in this way can be used to prevent other parts of the bus system, including other functional blocks, from being affected.

Some embodiments of the present disclosure also provide a method of resetting only a functional block that is problematic in a bus system, in response to the operation of the functional block being stopped.

However, some embodiments of the bus system of the present disclosure are not restricted to the specific details set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, a bus system includes is a slave functional block and a master functional block. The master functional block transmits a first command to the slave functional block. The slave functional block includes a first bus protector. The first bus protector receives the first command on behalf of the slave functional block and transmits a dummy signal corresponding to the first command to the master functional block in response to the slave functional block being in a state of not being able to receive the first command or not being able to transmit a response signal corresponding to the first command.

According to some embodiments, a bus system includes a bus and a system manager. Multiple functional blocks, including a first slave functional block, are connected to the bus. If the operation of the first slave functional block is stopped and a first command to the first slave functional block does not exist on the bus, the system manager resets the first slave functional block.

According to some embodiments, a bus system includes a first slave functional block including a first bus protector, a second slave functional block including a second bus protector, and a master functional block. The master functional block transmits a first command to the first slave functional block and transmits a second command to the second slave functional block. In response to the first slave functional block being in a state of not being able to receive the first command or not being able to transmit a response signal corresponding to the first command, the first bus protector receives the first command on behalf of the first slave functional block and transmits to the master functional block a first dummy signal corresponding to the first command. The second slave functional block transmits a response signal corresponding to the second command to the master functional block.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which.

DETAILED DESCRIPTION

Figure 1:
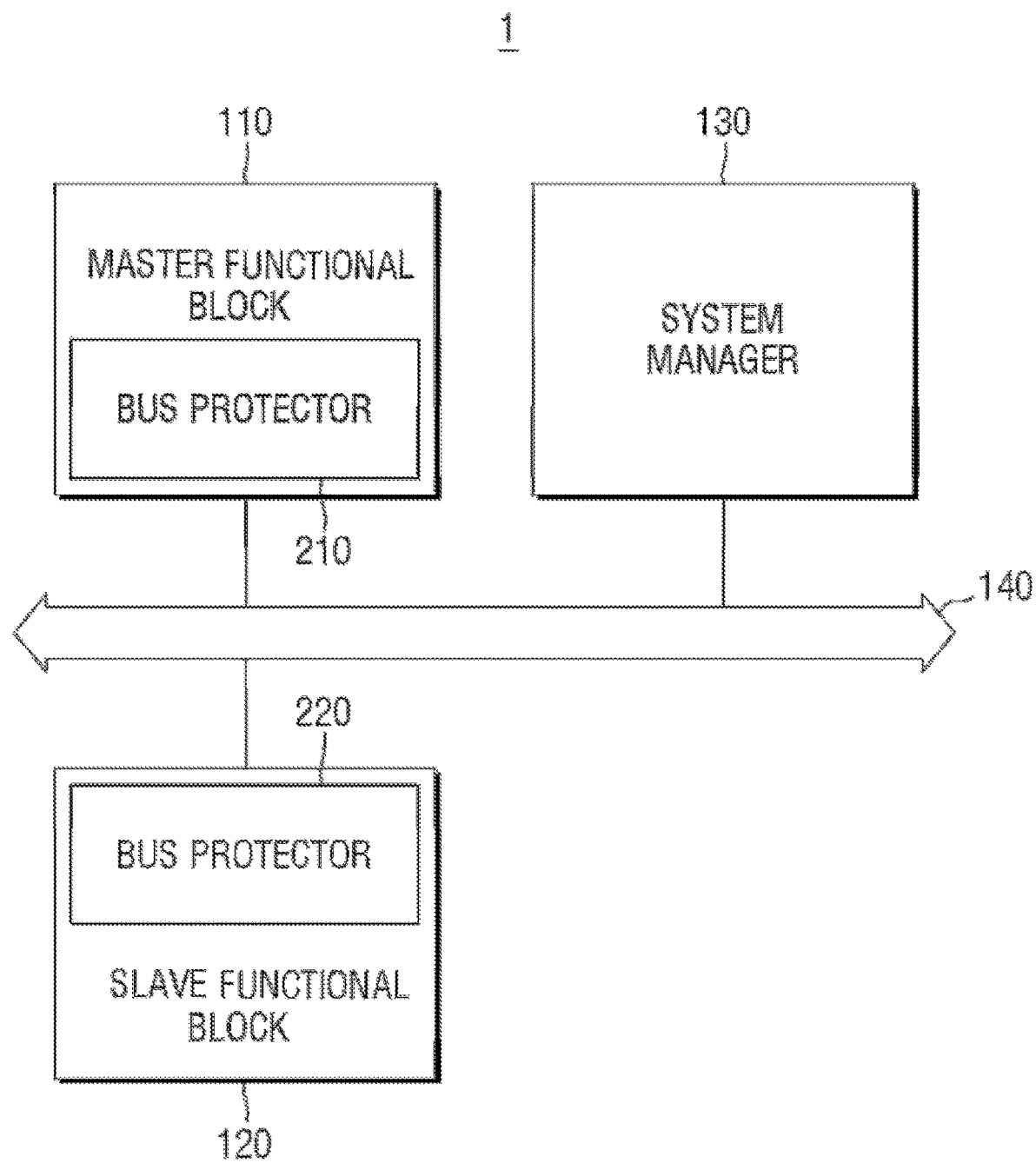
FIG. 1 is a block diagram of a bus system according to some exemplary embodiments of the present disclosure.

FIG. 1 is a block diagram of a bus system according to some exemplary embodiments of the present disclosure.

Referring to FIG. 1, a bus system 1 may include multiple functional blocks, a system manager 130, and a bus 140. The bus system 1 may be implemented on a single chip, such as a chip for an SoC that includes and integrates the multiple functional blocks, the system manager 130, and the bus 140. Accordingly, a SoC may be implemented by a single chip on which the bus system 1 is implemented.

The multiple functional blocks of the bus system 1 may include, for example, a master functional block 110 and a slave functional block 120 as shown. The term "functional block," as used herein, may refer to an intellectual property (IP) block. Each functional block may be a discrete circuit such as an Intellectual Property block (IP block). An IP block may be a unit of logic, cell or integrated circuit that may be reusable and may be subject to intellectual property of a single party as a unique unit of logic, cell or integrated circuit. A discrete circuit such as an IP block may have a discrete combination of structural circuit components, and may be dedicated in advance to performing particular functions. The elements illustrated in FIG. 1 are not necessarily essential for realizing the bus system 1. For example, the bus system 1 may include more or fewer elements than the elements illustrated in FIG. 1.

According to some embodiments, the bus system 1 may be a bus system for a mobile device or may be a bus system for a device for a vehicle. The mobile device may be a mobile phone, a smart phone, an enterprise digital assistant (EDA), a digital still camera, a digital video camera, a personal (or portable) navigation device (PND), a mobile Internet device (MID), a wearable computer, an Internet of things (IoT) device, an Internet of Everything (IoE) device, or an electronic-book (e-book). The device for a vehicle may be an electronic device used in a vehicle.

The master functional block 110 may be a functional block (such as an IP block) for generating a command. The master functional block 110 may be or include, for example, an application chip, an image processor, an audio codec, a communication station modem, or the like.

The slave functional block 120 may be a functional block (such as an IP block) that receives a command generated by the master functional block 110. Alternatively, the slave functional block 120 may be a functional block (such as an IP block) that becomes the target of the command generated by the master functional block 110. In an example, the slave functional block 120 may be or include, for example, a sensor hub, a memory, or the like.

That is, the functional block (such as an IP block) that generates a command may be the master functional block 110. The functional block (such as an IP block) that receives the command and/or becomes the target of the command generated by the master functional block 110 may be the slave functional block 120.

The functional block (such as an IP block) that currently serves as the master functional block 110 may become the slave functional block 120 later. Additionally, the functional block (such as an IP block) that currently serves as the slave functional block 120 may become the master functional block 110 later.

The system manager 130 may also be an IP block. The system manager 130 may manage all operations performed in the bus system 1. In an example, the system manager 130 may be or include a central processing unit, a microcontroller, a microprocessor, a digital signal processor, or the like.

The descriptions herein may refer to a system manager such as a system manager 130. As noted above, a system manager 130 may be embodied by a processor (e.g., the central processing unit, microcontroller, microprocessor, digital signal processor noted above) that executes a particular dedicated set of software instructions, such as a software module. The processor executes the instructions to control operations of the system manager 130.

Any processor (or similar element) described herein is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor is configured to execute software instructions in order to perform functions as described in the various embodiments herein. A processor may be a general-purpose processor or may be part of an application specific integrated circuit (ASIC). A processor may also be a microprocessor, a microcomputer, a processor chip, a controller, a microcontroller, a digital signal processor (DSP), a state machine, or a programmable logic device. A processor may also be a logical circuit, including a programmable gate array (PGA) such as a field programmable gate array (FPGA), or another type of circuit that includes discrete gate and/or transistor logic. A processor may be a central processing unit (CPU). Additionally, any processor described herein may include multiple processors, parallel processors, or both. Multiple processors may be included in, or coupled to a single, physically integrated SoC and/or a single device that includes such a SoC. Sets of instructions can be read from a computer-readable medium. Further, the instructions, when executed by a processor, can be used to perform one or more of the methods and processes as described herein. In a particular embodiment, the instructions may reside completely, or at least partially, within a main memory, a static memory, and/or within a processor during execution.

In an alternative embodiment, dedicated hardware implementations, such as application-specific integrated circuits (ASICs), programmable logic arrays and other hardware components for functional blocks, bus protectors and system managers described herein, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

According to some embodiments, the system manager 130 determines whether the operation of each of the multiple functional blocks (such as IP blocks) included in the bus system 1 is in a state of being stopped. For example, the system manager 130 may determine whether the master functional block 110 or the slave functional block 120 included in the bus system 1 is in a state of being stopped. This will be described later in detail with reference to FIG. 7.

Expressions such as "the operation of a functional block being in a state of being stopped," as used herein, may mean that the functional block is in a state of not being able to transmit a command or a response signal for a command.

In an example, when the operation of the master functional block 110 is in the state of being stopped, the master functional block 110 may be in a state of not being able to generate and transmit a command for the slave functional block 120.

In another example, when the operation of the slave functional block 120 is in the state of being stopped, the slave functional block 120 may be in a state of not being able to receive a command that is transmitted by the master functional block 110, such that the command transmitted by the master functional block 110 remains on the bus 140. Additionally or alternatively, the slave functional block 120 may be in a state of not being able to transmit a response signal for the command to the master functional block 110.

When the system manager 130 generates a command, the system manager 130 may also become the master functional block 110. However, for convenience, the system manager 130 will hereinafter be described as a separate entity from the master functional block 110.

Each of the functional blocks (such as IP blocks) may include a bus protector. For example, the master functional block 110 and the slave functional block 120 may each include a bus protector 210 or bus protector 220. The bus protector 210 and bus protector 220 may clear commands that remain on the bus 140 when the corresponding functional blocks stop operating.

Bus protectors as described herein may themselves be functional blocks (e.g., IP blocks), and may include a processor, memory, and/or other elements of a circuit. As described herein, a bus protector may clear a command on a bus, receive a command or a response to a command, process a command, generate and transmit a dummy signal, and generate information. A bus protector may execute predetermined instructions in order to perform any of these functions. Additionally, a bus protector may include a switch, or may control a switch, in order to dynamically and electively receive a command on behalf of a functional block that includes the bus protector.

The bus protector 210 may be included in the master functional block 110. In an example, when the operation of the master functional block 110 is stopped, the bus protector 210, may receive a response signal transmitted by the slave functional block 120, on behalf of the master functional block 110.

The bus protector 220 may be included in the slave functional block 120. In another example, when the operation of the slave functional block 120 is stopped, the bus protector 220, may receive a command transmitted by the master functional block 110, may generate a response signal, and may transmit the generated response signal to the master functional block 110.

The master functional block 110, the slave functional block 120, and the system manager 130 may exchange signals, commands, or data with one another via the bus 140. That is, the bus 140 may connect the master functional block 110 and the slave functional block 120 to each other. In an example, the bus 140 may be any of a peripheral component interconnect (PCI) bus, a PCI express (PCIe) bus, an advanced microcontroller bus architecture (AMBA) bus, an advanced high-performance bus (AHB), an advanced peripheral bus (APB), an advanced extensible interface (AXI) bus, and a combination thereof, but the present disclosure is not limited thereto.

FIG. 1 illustrates an example in which the bus system 1 includes only one master functional block 110 and only one slave functional block 120, but the present disclosure is not limited thereto. That is, in another example, the bus system 1 may include two or more master functional blocks 110 and two or more slave functional blocks 120. The master functional blocks 110 and the slave functional blocks 120 may each include a bus protector.

Figure 2:
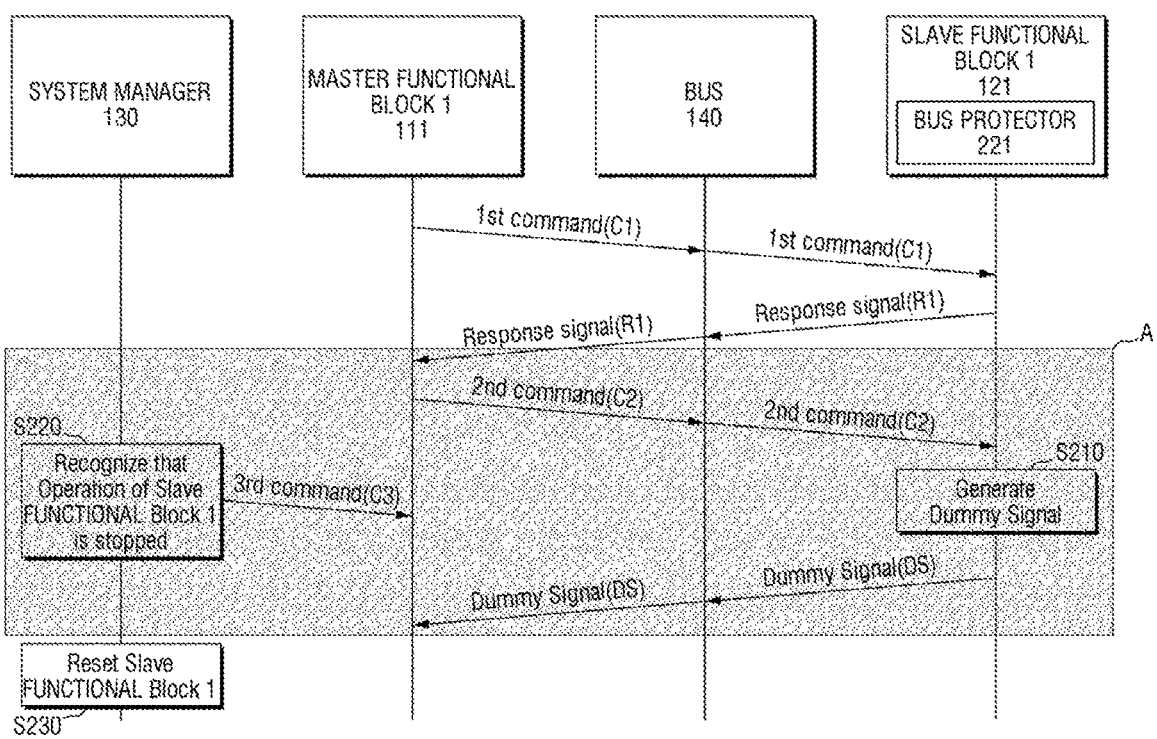
FIG. 2 is a flowchart illustrating a method of resetting a slave functional block whose operation is stopped, according to some exemplary embodiments of the present disclosure.

FIG. 2 is a flowchart illustrating a method of resetting a slave functional block whose operation is stopped, according to some embodiments of the present disclosure. FIGS. 3 through 6, 8, and 9 are schematic views illustrating the method of resetting a slave functional block whose operation is stopped, according to some embodiments of the present disclosure. FIG. 7 is a schematic view illustrating a method of recognizing a slave functional block whose operation is stopped, according to some embodiments of the present disclosure.

Referring to FIG. 2, a first master functional block 111 may transmit a first command C1 to a first slave functional block 121. The first command C1 may be transmitted to the first slave functional block 121 via a bus 140.

Figure 3:
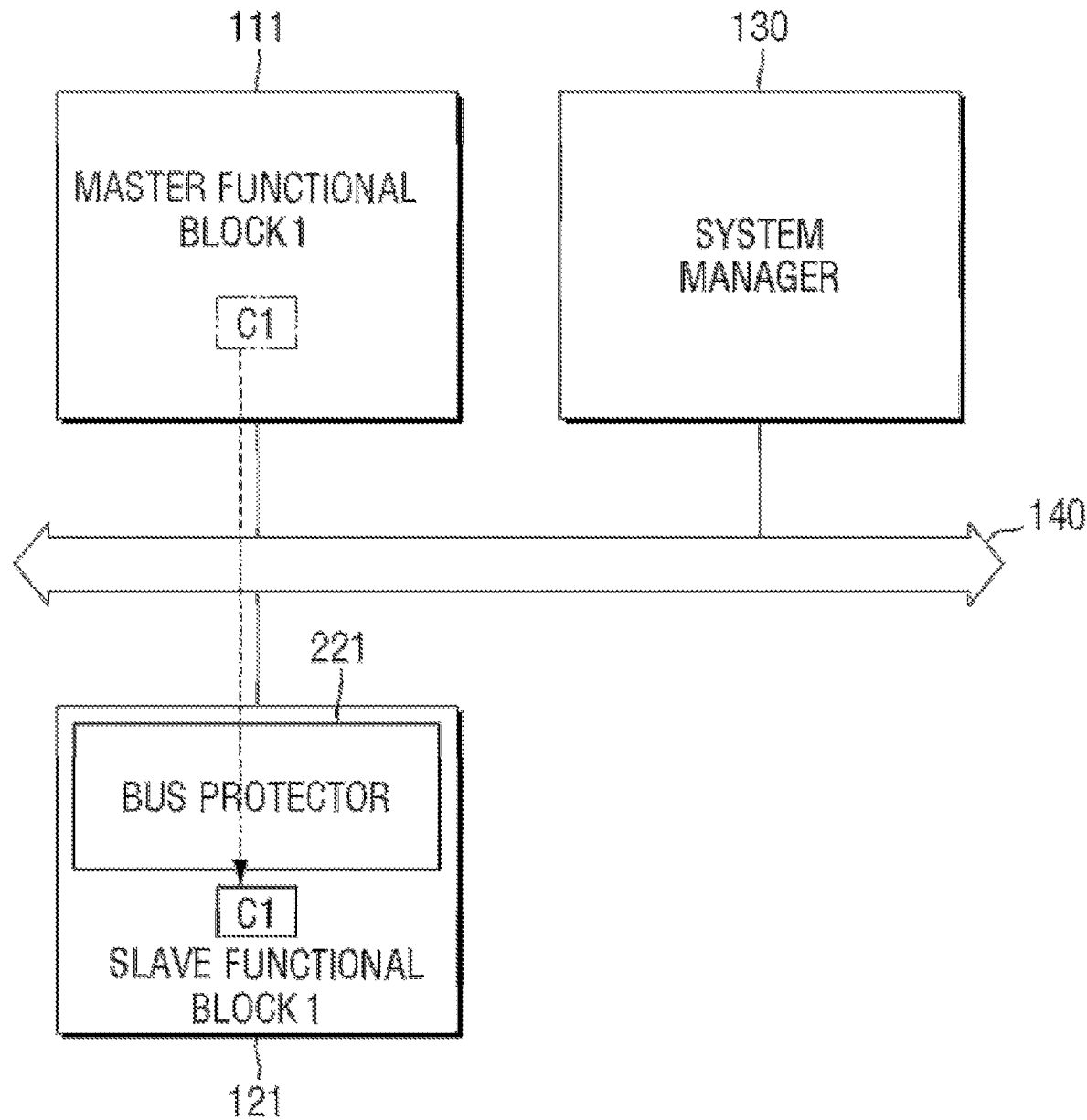
FIG. 3 is a schematic view illustrating the method of resetting a slave functional block whose operation is stopped, according to some exemplary embodiments of the present disclosure.

In an example, referring to FIG. 3, in response to the first master functional block 111 transmitting the first command C1 to the first slave functional block 121, the first slave functional block 121 may receive the first command C1 via the bus 140.

The first command C1 may be a read command or a write command, but the present disclosure is not limited thereto. That is, the first command C1 may be other than a read command or a write command.

Referring again to FIG. 2, in response to the first command C1 being received, the first slave functional block 121 may transmit a response signal R1 for the first command C1 to the first master functional block 111 via the bus 140.

In an example, if the command C1 received by the first slave functional block 121 is a read command, the response signal R1 may include data corresponding to the read command and a response corresponding to the read command. The data corresponding to the read command may be data requested by the read command. The response corresponding to the read command may be information that indicates that the first slave functional block 121 has performed a read operation normally in response to the read command.

In another example, if the command C1 received by the first slave functional block 121 is a write command, the response signal R1 may include information that indicates that the first slave functional block 121 has performed a write operation normally in response to the write command.

Figure 4:
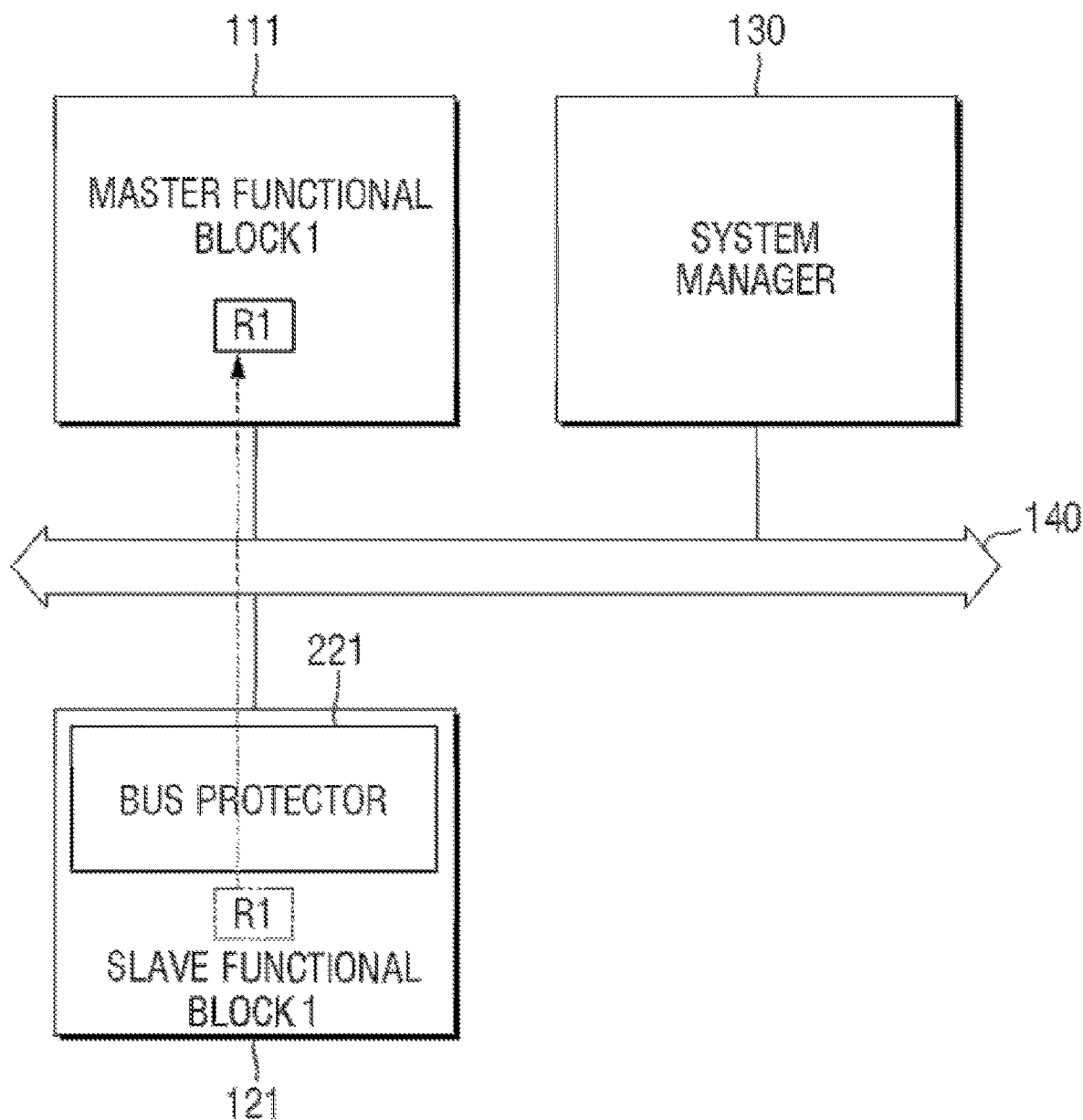
FIG. 4 is another schematic view illustrating the method of resetting a slave functional block whose operation is stopped, according to some exemplary embodiments of the present disclosure.

Referring to FIG. 4, the first master functional block 111 may receive the response signal R1 transmitted by the first slave functional block 121 via the bus 140. A bus protector 221 is included in the first slave functional block 121. The bus protector 221 may not perform any particular operation because the first slave functional block 121 is operating normally.

According to some embodiments, even when the first slave functional block 121 is operating normally, the bus protector 221 of the first slave functional block 121 may receive the first command C1, but may not perform any operation relating to the first command C1 or receipt of the first command.

Referring again to FIG. 2, the first master functional block 111 may transmit a second command C2 to the bus 140. Then, before the transmission of the second command C2 from the bus 140 to the first slave functional block 121, the operation of the first slave functional block 121 may be stopped (A).

In this case, the first slave functional block 121 cannot transmit a response signal for the second command C2 to the first master functional block 111. In an example, when the operation of the first slave functional block 121 is stopped (A), the first slave functional block 121 cannot receive the second command C2. Accordingly, the first slave functional block 121 cannot transmit a response signal for the second command C2 to the first master functional block 111. Since the first slave functional block 121 cannot receive the second command C2, the second command C2 may be able to remain on the bus 140.

According to some embodiments, the bus protector 221 is included in the first slave functional block 121. The problem of the second command C2 continuing to remain on the bus 140 is addressed by the bus protector 221 being configured to receive the second command C2 in a case where the operation of the first slave functional block 121 is stopped.

Figure 5:
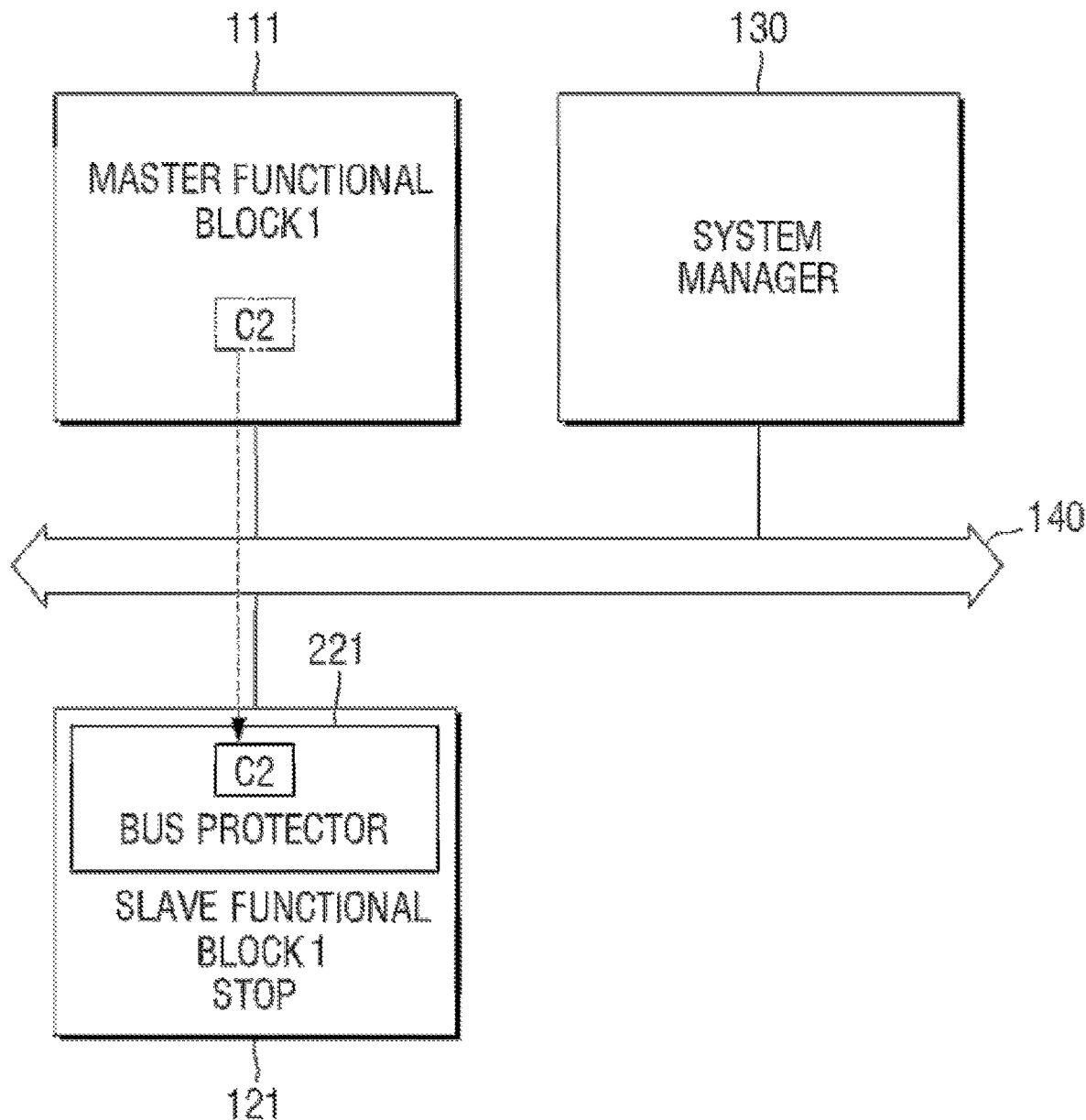
FIG. 5 is another schematic view illustrating the method of resetting a slave functional block whose operation is stopped, according to some exemplary embodiments of the present disclosure.

In an example, referring to FIG. 5, in a state wherein the operation of the first slave functional block 121 is stopped, the bus protector 221 of the first slave functional block 121 may receive the second command C2 on behalf of the first slave functional block 121.

That is, the bus protector 221 may process the second command C2 on behalf of the first slave functional block 121 whose operation is stopped.

In an example, referring to FIG. 2, in a state wherein the operation of the first slave functional block 121 is stopped (A), the bus protector 221 of the first slave functional block 121 may generate a dummy signal DS (S210).

In an example, if the second command C2 is a read command, the dummy signal DS may include dummy data and a dummy response. In this example, the dummy data may be arbitrary data other than data requested by the read command. The dummy response may be information that indicates that an operation corresponding to the read command has been performed by the first slave functional block 121.

In another example, if the second command C2 is a write command, the dummy signal DS may include a dummy response. In this example, the dummy response may be information indicating that an operation corresponding to the write command has been performed by the first slave functional block 121, even though the operation has not in fact been performed.

If information transmitted as a dummy response indicates that an operation corresponding to the second command C2 has not been properly performed by the first slave functional block 121 and that an error has occurred, the operation of an entire bus system may be terminated. Thus, the bus protector 221 may generate information that indicates that the operation corresponding to the second command C2 has been properly performed as a dummy response, even though the operation has not in fact been performed.

The bus protector 221 of the first slave functional block 121 may transmit the dummy signal DS to the first master functional block 111 that has sent the second command C2.

Figure 6:
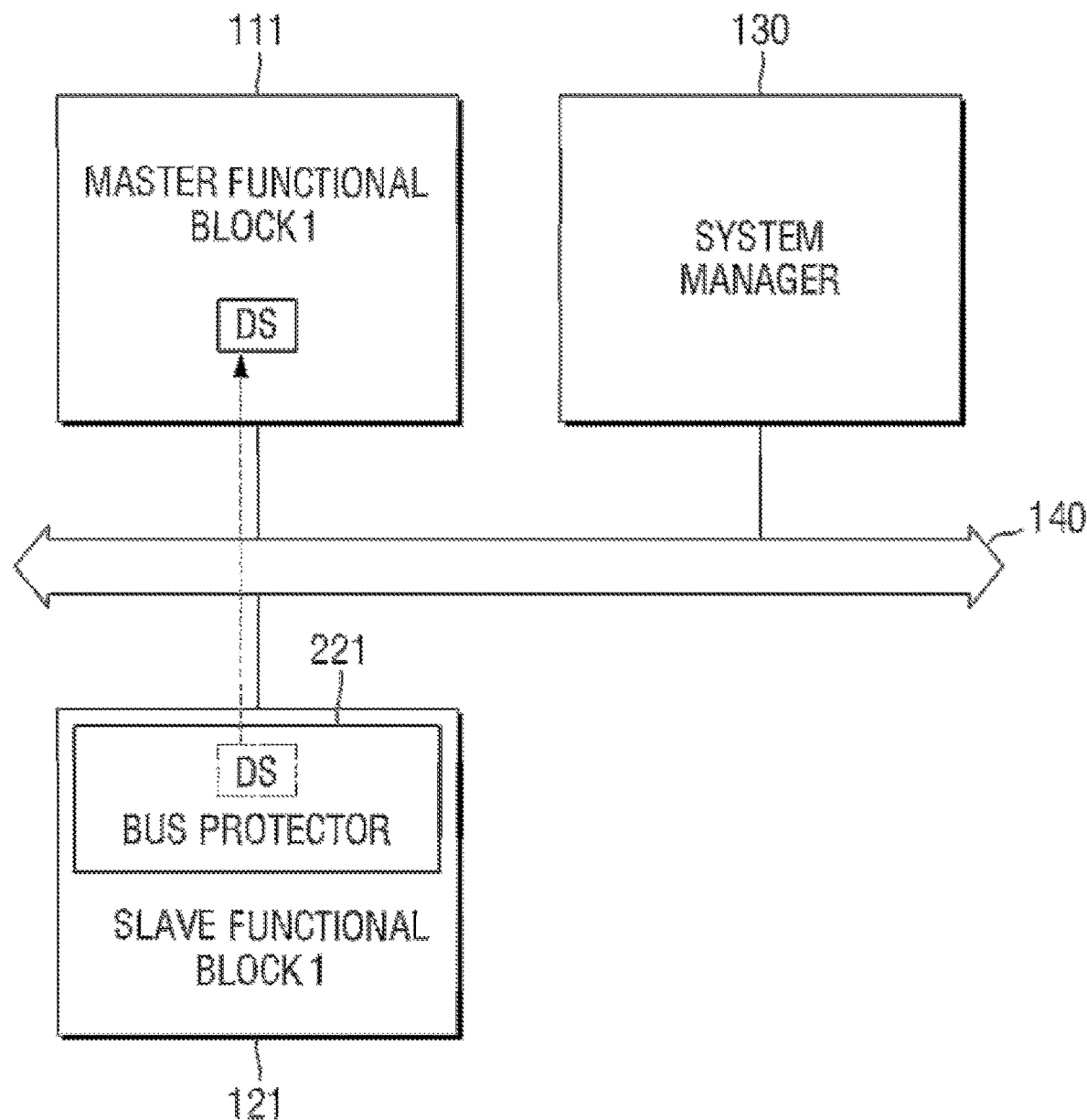
FIG. 6 is another schematic view illustrating the method of resetting a slave functional block whose operation is stopped, according to some exemplary embodiments of the present disclosure.
Figure 7:
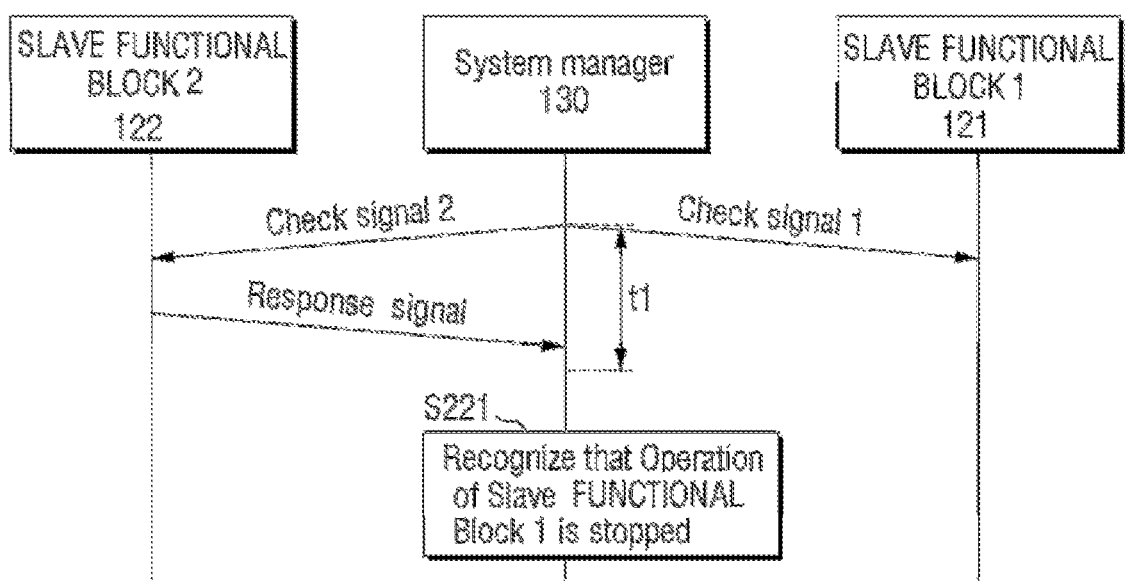
FIG. 7 is a schematic view illustrating a method of recognizing a slave functional block whose operation is stopped, according to some exemplary embodiments of the present disclosure.

Referring to FIG. 6, the first master functional block 111 may receive the dummy signal DS, transmitted by the bus protector 221 of the first slave functional block 121, via the bus 140.

Referring again to FIG. 2, in response to the dummy signal DS being received, the first master functional block 111 may recognize that it has received a response signal for the second command C2. Even though the first master functional block 111 has not received an actual response signal for the second command C2, commands that remain on the bus 140 may be cleared because the first master functional block 111 has received the dummy signal DS.

The system manager 130 may determine whether the first slave functional block 121 (e.g., a first IP Block) has stopped operating (S220).

For example, the system manager 130 may transmit a check signal to all functional blocks included in the bus system and may determine functional blocks from which a response signal is received within a predetermined amount of time after the transmission of the check signal as operating normally. Also, the system manager 130 may determine functional blocks from which the response signal is not received within the predetermined amount of time after the transmission of the check signal as having stopped operating.

Referring to FIG. 7, the system manager 130 may transmit a first check signal to the first slave functional block 121 and a second check signal to a second slave functional block 122.

The system manager 130 may determine whether a response signal for the first check signal and a response signal for the second check signal are received within a predetermined amount of time t1.

If the response signal for the first check signal is not received within the predetermined amount of time t1, the system manager 130 may recognize that the first slave functional block 121 has stopped operating (S221).

On the other hand, if the response signal for the second check signal is received within the predetermined amount of time t1, the system manager 130 may recognize that the second slave functional block 122 operates normally.

According to some embodiments, the system manager 130 may determine whether the first master functional block 111 has stopped operating. The system manager 130 may use the same method as that described above with reference to FIG. 7 to determine whether the first master functional block 111 has stopped operating. Thus, a detailed description of how the system manager 130 determines whether the first master functional block 111 has stopped operating will be omitted.

Referring again to FIG. 2, if it is recognized that the operation of the first slave functional block 121 is stopped, the system manager 130 may transmit a third command C3 for stopping the additional generation of commands for the first slave functional block 121 to the first master functional block 111.

In response to the third command C3 being received, the first master functional block 111 may stop generating any commands for the first slave functional block 121 until the first slave functional block 121 is reset.

Figure 8:
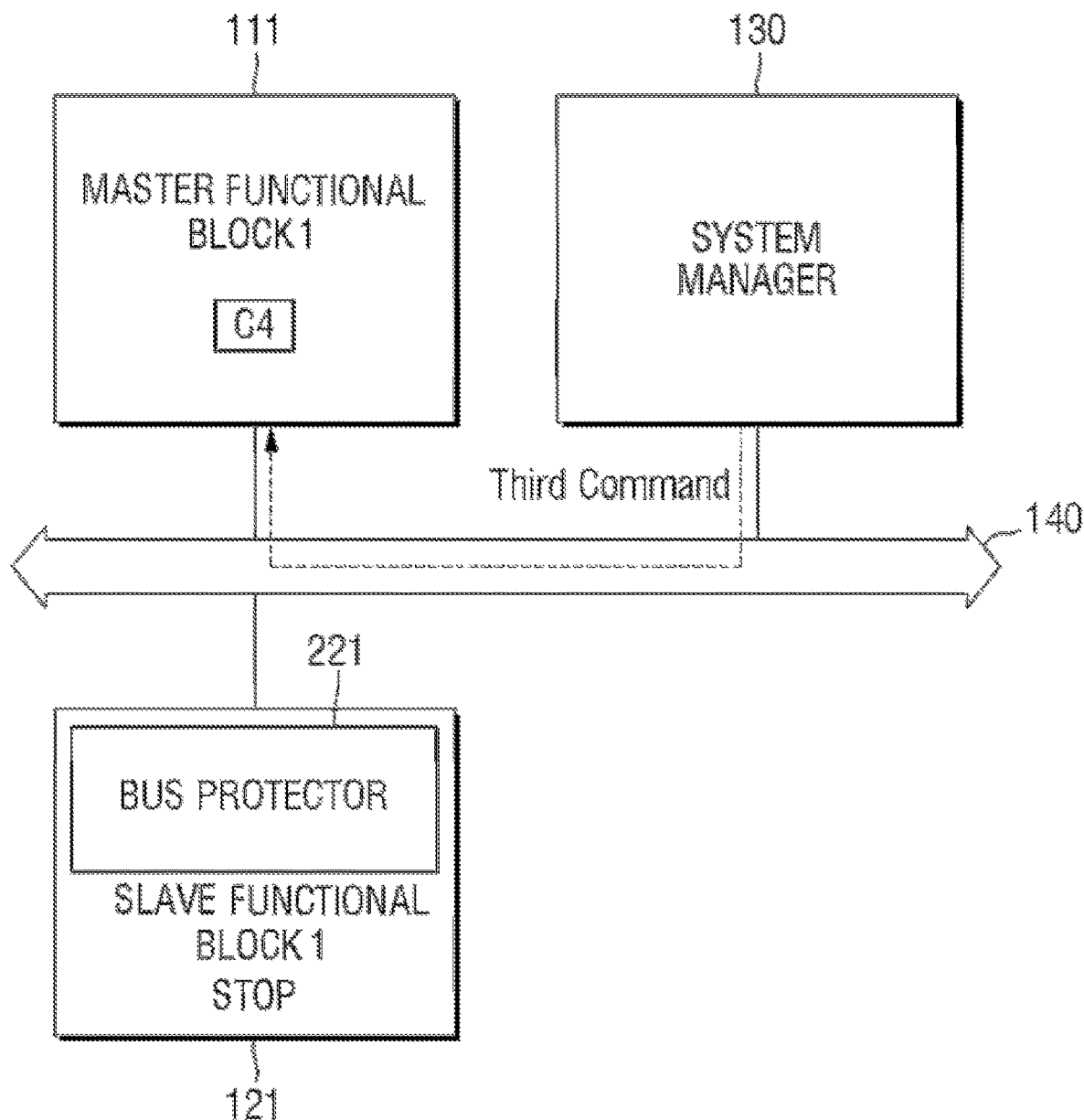
FIG. 8 is another schematic view illustrating the method of resetting a slave functional block whose operation is stopped, according to some exemplary embodiments of the present disclosure.
Figure 9:
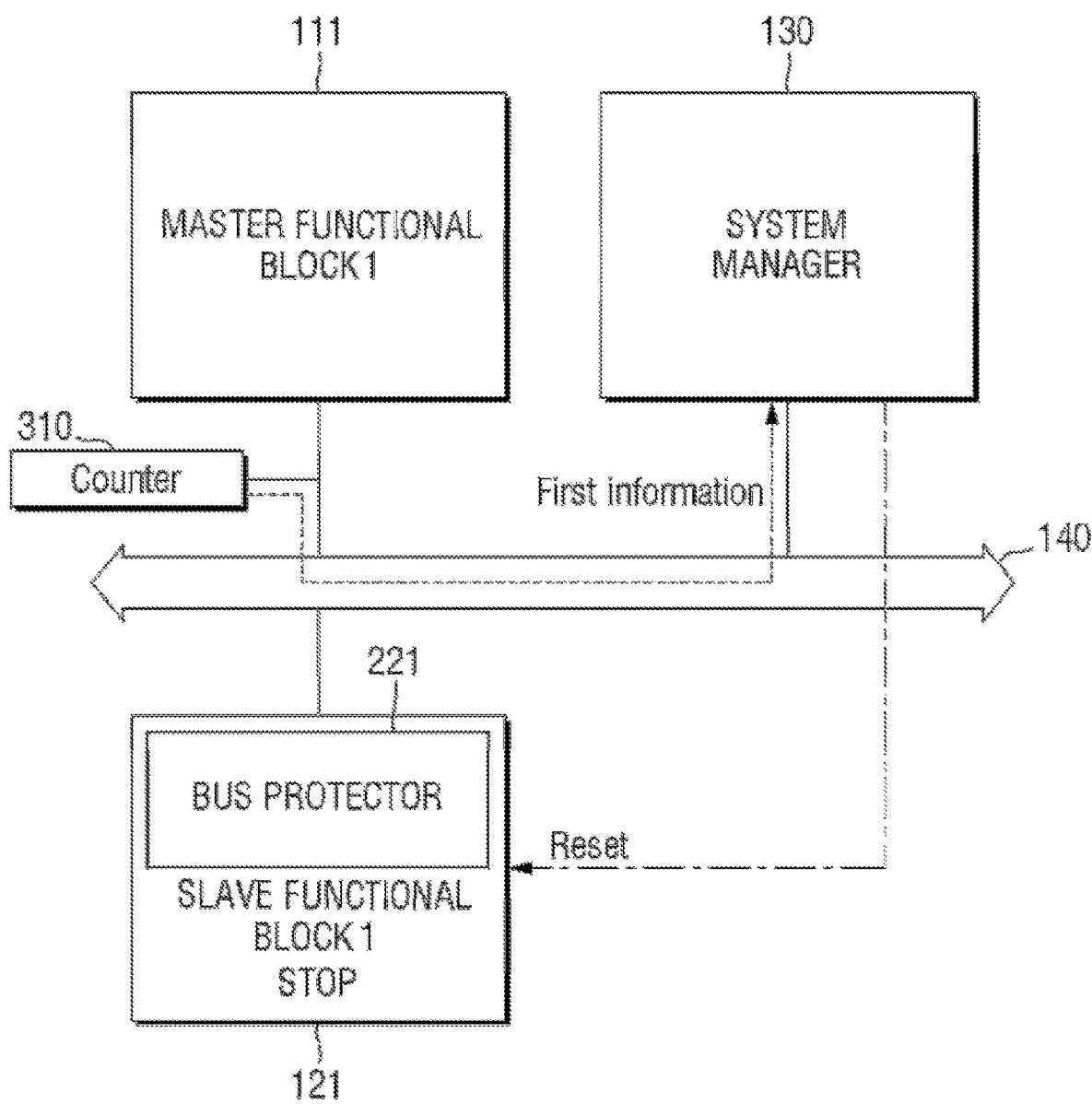
FIG. 9 is a schematic view illustrating a method of resetting a slave functional block whose operation is stopped in a modified bus system, according to some exemplary embodiments of the present disclosure.

Referring to FIG. 8, in a case where the first master functional block 111 generates a fourth command C4 for the first slave functional block 121 but is yet to transmit the fourth command to the bus 140, the first master functional block 111 may receive the third command C3 for stopping the additional generation of commands for the first slave functional block 121. In this case, the first master functional block 111 may delay the transmission of the fourth command C4 until the first slave functional block 121 is reset.

That is, the generation and/or transmission of commands for the first slave functional block 121 whose operation is stopped may be terminated. As a result, generation of commands can be prevented from continuing for the first slave functional block 121 whose operation is stopped.

Referring again to FIG. 2, the system manager 130 may identify that no command exists on the bus 140 for the first slave functional block 121 whose operation is stopped. In this case, the system manager 130 may reset the first slave functional block 121 whose operation is stopped (S230).

The system manager 130 may use, for example, structural circuit elements connected to the bus 140, to reset the first slave functional block 121. In an example, referring to FIG. 9, the bus system may include a counter 310, which determines whether there exists a command on the bus 140 for the first slave functional block 121.

If it is recognized that the number of commands, generated by the first master functional block 111 for the first slave functional block 121, is the same as the number of dummy signals, generated by the first slave functional block 121 and transmitted to the first master functional block 111, the counter 310 may recognize that no command exists on the bus 140 for the first slave functional block 121. In this case, the counter 310 may transmit to the system manager 130 first information indicating that no command exists on the bus 140 for the first slave functional block 121.

In response to the first information being received, the system manager 130 may identify that no command exists on the bus 140 for the first slave functional block 121. The system manager 130 may reset the first slave functional block 121, as the absence of commands on the bus 140 minimizes the potential for miscommunication or other errors due to the reset.

Since the first slave functional block 121 is reset with no commands present on the bus 140 for the first slave functional block 121, no problems may be caused to the bus system.

According to some embodiments, if a predetermined amount of time (for example, 0.1 sec) elapses after the transmission of a command for the first slave functional block 121, the system manager 130 may recognize that no command exists on the bus 140 for the first slave functional block 121. Accordingly, the system manager 130 may reset the first slave functional block 121 the predetermined amount of time after the transmission of a command generated by the first master functional block 111 to the first slave functional block 121.

Figure 10:
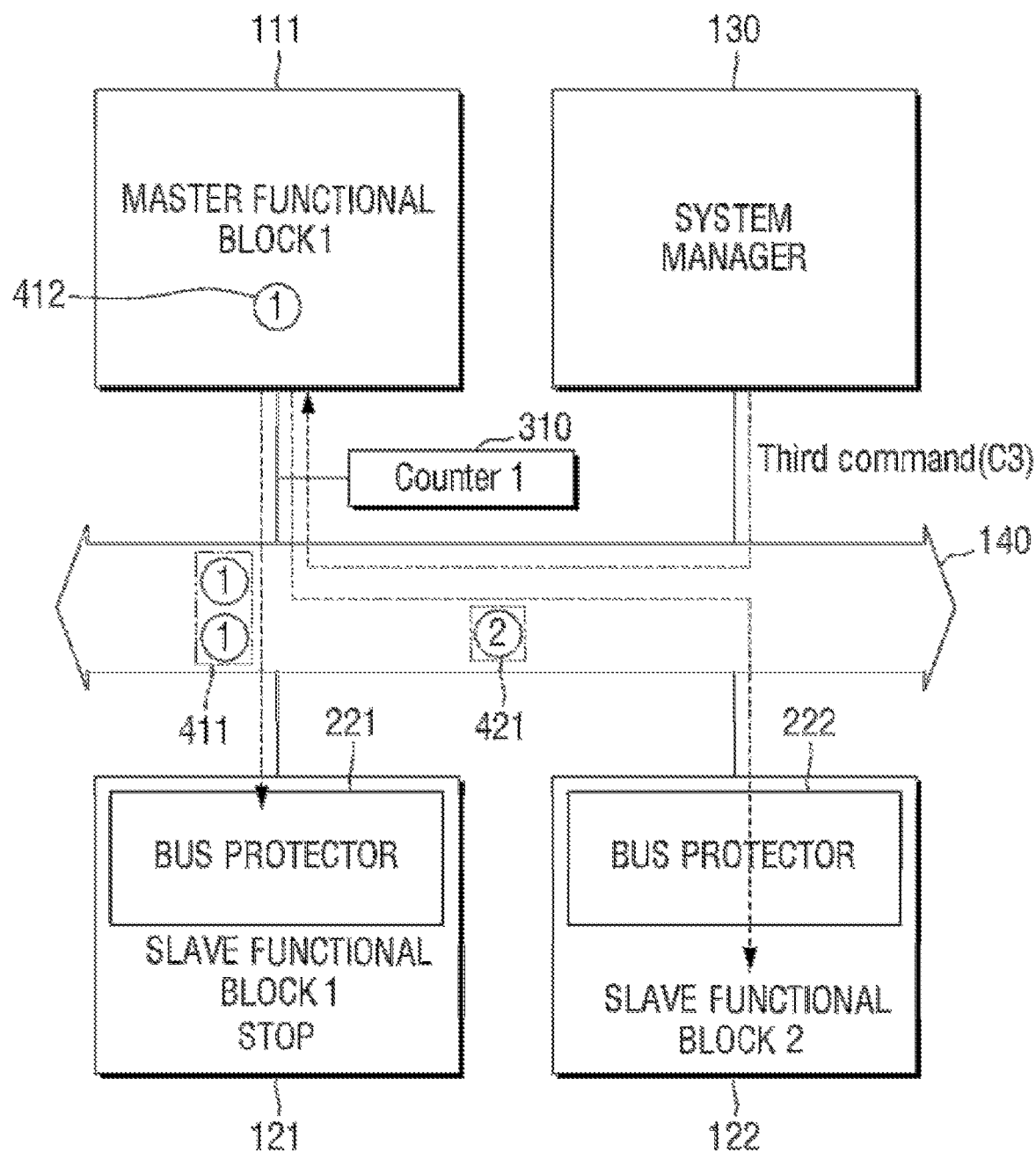
FIG. 10 is a schematic view illustrating a method of resetting a slave functional block whose operation is stopped in another (alternative) bus system with multiple slave functional blocks, according to some exemplary embodiments of the present disclosure.
Figure 11:
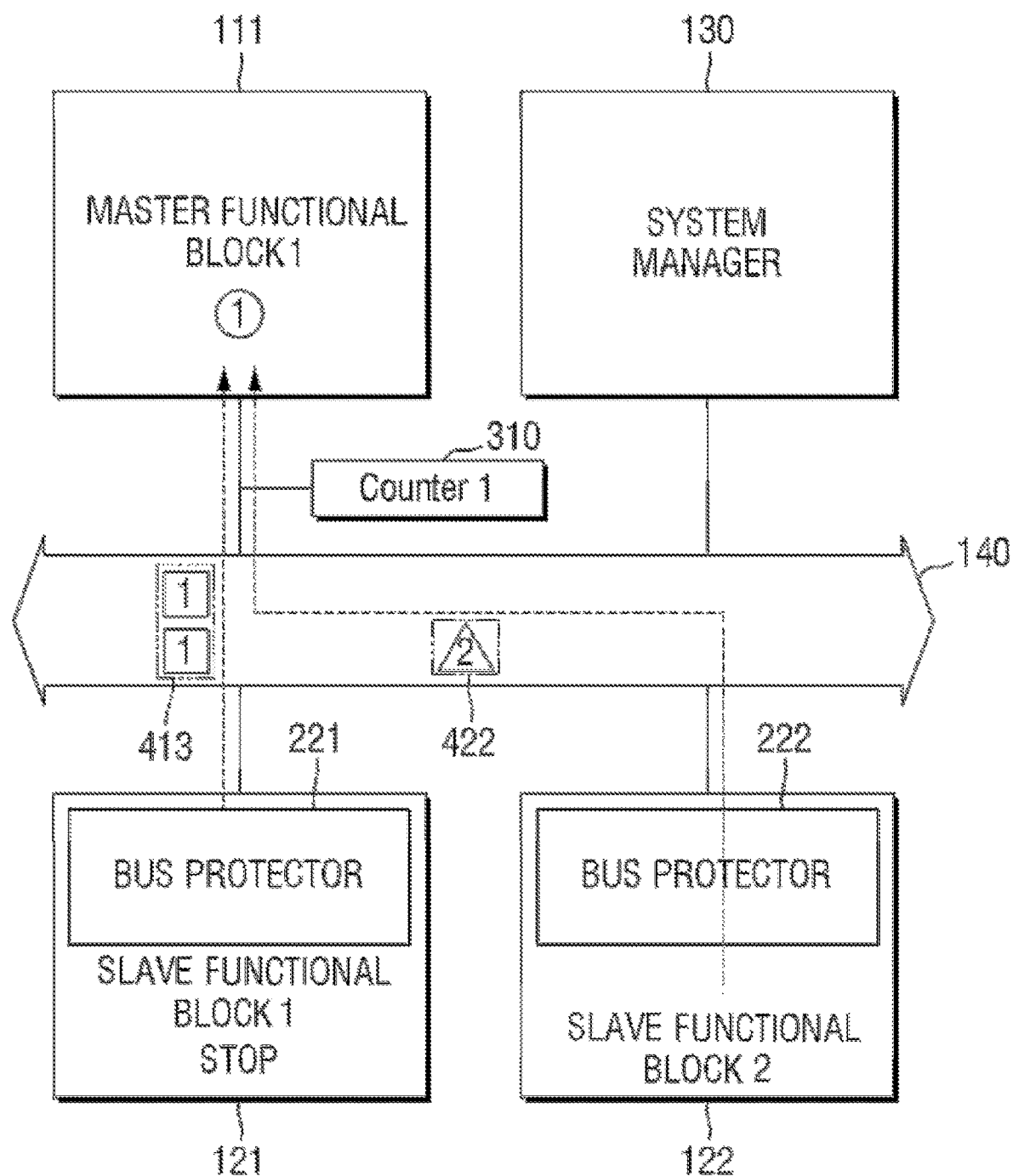
FIG. 11 is a schematic view illustrating another method of resetting a slave functional block whose operation is stopped in the bus system with multiple slave functional blocks, according to some exemplary embodiments of the present disclosure.
Figure 12:
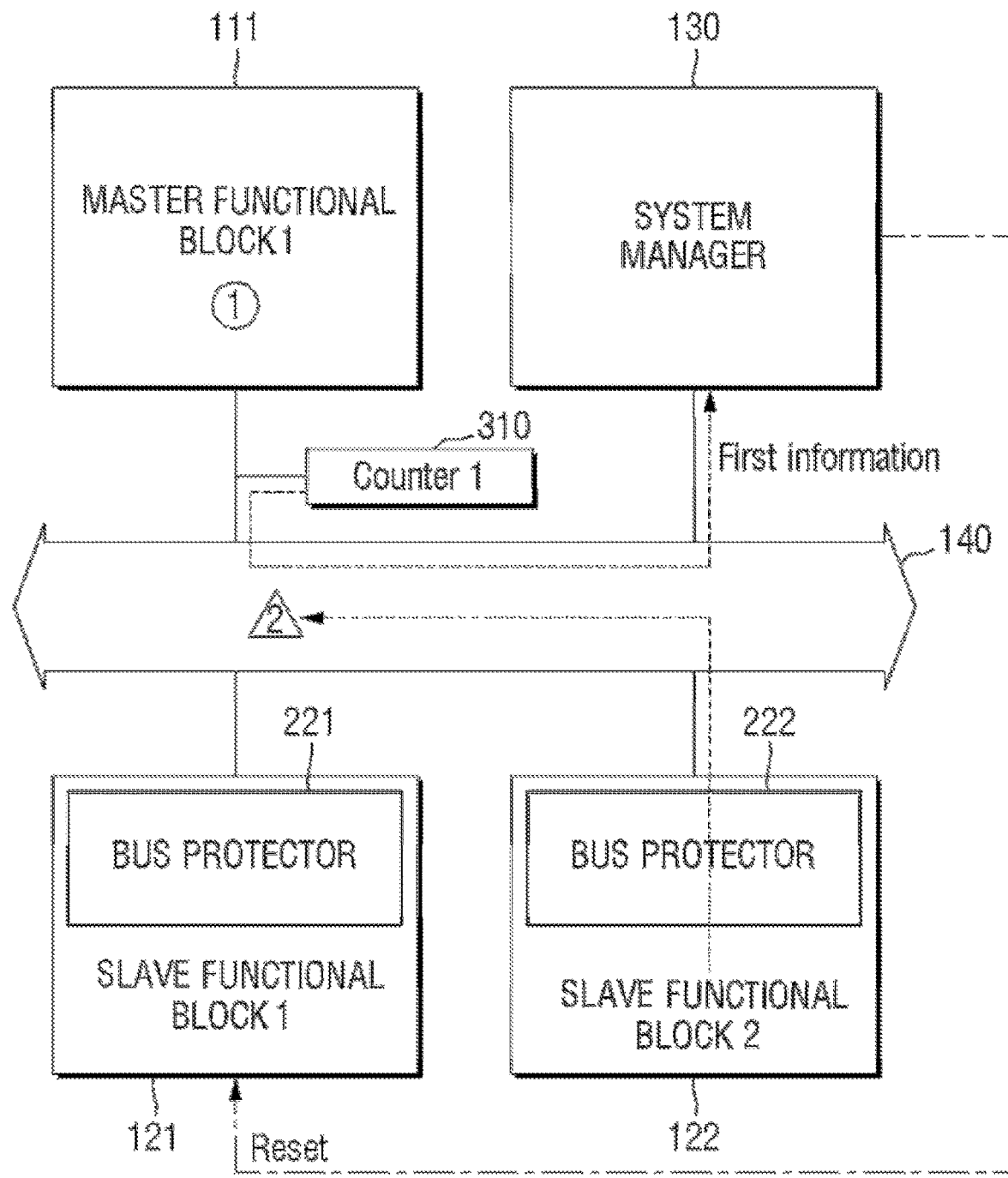
FIG. 12 is a schematic view illustrating another method of resetting a slave functional block whose operation is stopped in the bus system with multiple slave functional blocks, according to some exemplary embodiments of the present disclosure.

FIGS. 10 through 12 are schematic views illustrating a method of resetting a slave functional block whose operation is stopped, from among multiple slave functional blocks, according to some embodiments of the present disclosure.

Regarding FIGS. 10 through 12, it is assumed that a first master functional block 111 is a functional block that transmits commands to first slave functional block 121 and second slave functional block 122. For FIGS. 10 through 12, it is also assumed that the operation of the first slave functional block 121 is stopped and the second slave functional block 122 operates normally.

Referring to FIG. 10, in a case where it is recognized that the operation of the first slave functional block 121 is stopped, a system manager 130 may transmit the third command C3 for stopping the additional generation of commands for the first slave functional block 121 to the first master functional block 111. In response to the third command C3 being received, the first master functional block 111 may not generate any commands for the first slave functional block 121 until the first slave functional block 121 is reset.

Even in a case where the first master functional block 111 generates a command 412 for the first slave functional block 121 but is yet to transmit the command 412 to a bus 140, the first master functional block 111 may also receive the third command C3. In this case, the first master functional block 111 may delay the transmission of the command 412 to the first slave functional block 121 until the first slave functional block 121 is reset.

The first slave functional block 121 may include a bus protector 221. There may exist, on the bus 140, commands 411 for the first slave functional block 121. The commands 411 for the first slave functional block 121 may be generated and transmitted by the first master functional block 111 before the reception of the third command C3, and the operation of the first slave functional block 121 may be stopped. In this case, the bus protector 221 may receive the commands 411.

Referring to FIG. 11, in response to the commands 411 being received, the bus protector 221 may generate dummy signals 413 corresponding to the commands 411. The bus protector 221 may transmit the dummy signals 413 to the first master functional block 111. The first master functional block 111 may receive the dummy signals 413 via, for example, the bus 140.

The second slave functional block 122 may include a bus protector 222. Referring again to FIG. 10, the first master functional block 111 may generate a command 421 for the second slave functional block 122. Since the second slave functional block 122 operates normally, the second slave functional block 122 may receive the command 421 via the bus 140. In this case, the bus protector 222 may not generate a dummy signal corresponding to the command 421.

A command 421 of FIG. 10 may be received at a second slave functional block 122 from the first master functional block 111. Referring again to FIG. 11, the second slave functional block 122 may transmit to the first master functional block 111 a response signal 422 corresponding to the command 421. The second slave functional block 122 may transmit the response signal 422 via the bus 140.

In a case where it is recognized that there does exist any command for the first slave functional block 121 on the bus 140, the system manager 130 may reset the first slave functional block 121 whose operation is stopped.

In an example, the system manager 130 may recognize that there does not exist any command for the first slave functional block 121 on the bus 140 if a predetermined amount of time elapses after the transmission of a command for the first slave functional block 121. In this case, the system manager 130 may reset the first slave functional block 121.

In another example, the system manager 30 may determine whether there exists any command for the first slave functional block 121 on the bus 140 by using a counter 310. This will hereinafter be described with reference to FIG. 12.

Referring to FIG. 12, operation of a slave functional block may be stopped. A bus system may include a counter 310, which determines whether a command for this slave functional block (for example, the first slave functional block 121) exists on the bus 140.

If it is recognized that the number of commands generated by the first master functional block 111 for the first slave functional block 121 is the same as the number of dummy signals received by the first master functional block 111 from the first slave functional block 121, the counter 310 may recognize that no command exists on the bus 140 for the first slave functional block 121. In this case, the counter 310 may transmit to the system manager 130 first information indicating that no command exists on the bus 140 for the first slave functional block 121.

In response to the first information being received, the system manager 130 may identify that no command exists on the bus 140 for the first slave functional block 121. The system manager 130 may reset the first slave functional block 121 whose operation is stopped.

The counter 310 may also determine whether there exists a command on the bus 140 for the second slave functional block 122 that operates normally.

For example, the counter 310 may recognize that there does not exist any command on the bus 140 for the second slave functional block 122 if the number of commands for the second slave functional block 122 is the same as the number of response signals received from the second slave functional block 122.

According to some embodiments, the operation of a master functional block may be stopped. It will hereinafter be described how to reset a master functional block whose operation is stopped, using the system manager 130.

The system manager 130 may determine whether the operation of a master functional block is stopped, at intervals of a predetermined amount of time. A method of determining whether the operation of a master functional block is stopped may be similar to the method described above with reference to FIG. 7. Accordingly, a detailed description of the method of determining whether the operation of a master functional block is stopped will be omitted.

According to some embodiments, in a case where the operation of a master functional block is stopped, the system manager 130 may determine whether a command generated by the master functional block exists on the bus 140. In response to a determination being made that a command generated by the master functional block does not exist on the bus 140, the system manager 130 may readily reset the master functional block.

However, if the system manager 130 readily resets the master functional block with a command generated by the master functional block present on the bus 140, problems may be generated. Thus, the command generated by the master functional block may be cleared before the resetting of the master functional block.

A master functional block whose operation is stopped may include a bus protector. According to some embodiments, if there exists only one command on the bus 140, the bus protector may receive a response signal corresponding to the command from a slave functional block 120. In this case, in response to the response signal being received by the bus protector of the master functional block whose operation is stopped, the command may be cleared from the bus 140. Thus, in response to the response signal being received by the bus protector of the master functional block whose operation is stopped, the system manager 130 may reset the master functional block whose operation is stopped.

According to some embodiments, the operation of a master functional block may be stopped in the process of transmitting multiple commands. This will hereinafter be described with reference to FIG. 13.

Figure 13:
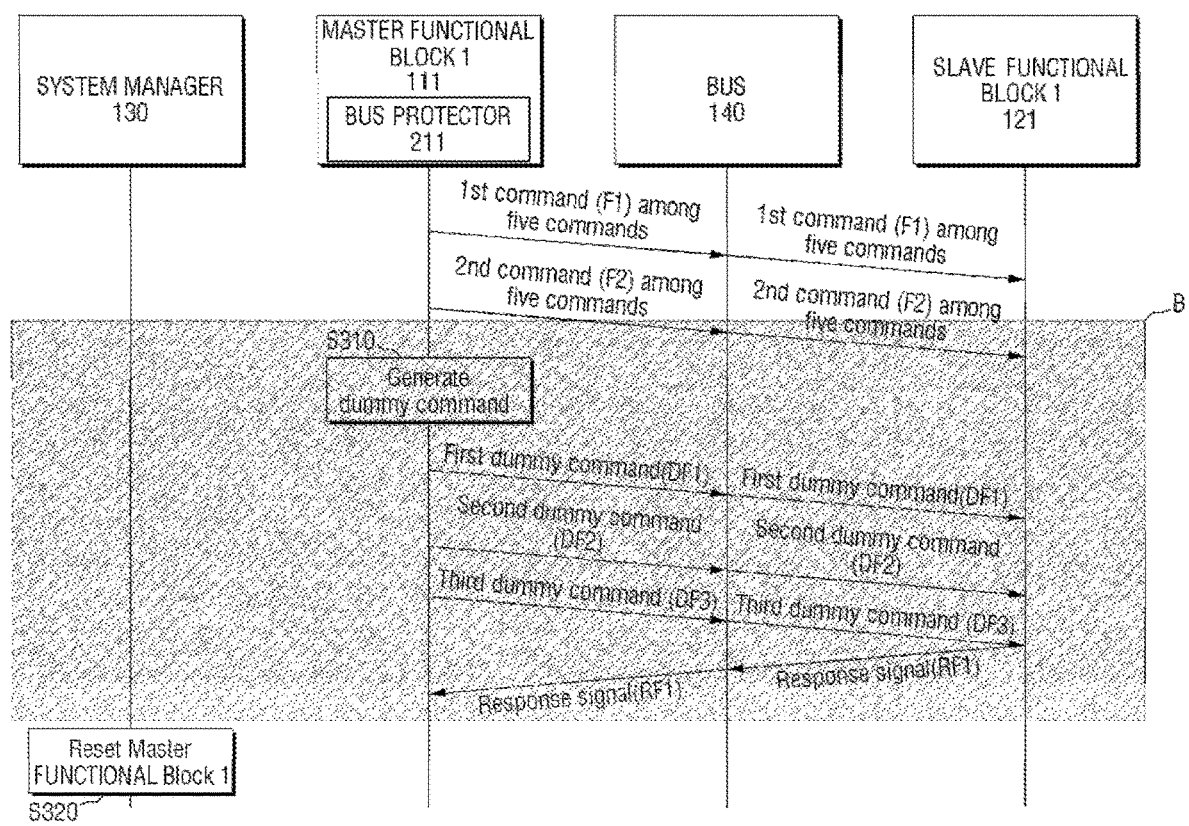
FIG. 13 is a flowchart illustrating another method of resetting a master functional block whose operation is stopped, in this case in the process of transmitting multiple commands, according to some exemplary embodiments of the present disclosure.

FIG. 13 is a flowchart illustrating a method of resetting a master functional block whose operation is stopped in the process of transmitting multiple commands.

Referring to FIG. 13, a bus system may include a first master functional block 111, a first slave functional block 121, a system manager 130, and a bus 140. The first master functional block 111 may include a bus protector 211.

The operation of the first master functional block 111 may be stopped in the process of transmitting multiple commands for the first slave functional block 121.

For example, the operation of the first master functional block 111 may be stopped after the transmission of two of five commands, i.e., first command F1 and second command F2. In this case, the first slave functional block 121 may receive the first command F1 and second command F2 and may then stand by until the other three commands are additionally transmitted by the first master functional block 111.

Conventionally, when the operation of the first master functional block 111 is stopped (B) after the transmission of two of five commands, the first slave functional block 121 may stand by indefinitely until the three commands yet to be transmitted are transmitted by the first master functional block 111, thereby causing problems.

On the other hand, according to some embodiments, when the operation of the first master functional block 111 is stopped (B) after the transmission of two of five commands, the bus protector 211 of the first master functional block 111 may generate dummy commands DF1, DF2, and DF3 corresponding to the three commands yet to be transmitted (S310). The generated dummy commands are simply commands corresponding to the three commands yet to be transmitted and do not request any operation (for example, a read or write operation).

Thus, the operation of the first master functional block 111 may be stopped after the transmission of an M-th command among N commands (where N is a natural number and M is a natural number smaller than N) for the first slave functional block 121. As a result, the bus protector 211 of the first master functional block 111 may generate (N-M) dummy commands and may transmit the generated (N-M) dummy commands to the first slave functional block 121.

The first slave functional block 121 may receive the dummy commands DF1, DF2, and DF3 via the bus 140. The first slave functional block 121 may transmit a response signal RF1 to the first master functional block 111 after receiving the last dummy command DF3. In this case, since the operation of the first master functional block 111 is already stopped (B), the bus protector 211 may receive the response signal RF1 on behalf of the first master functional block 111.

The dummy command DF3 is received at the first slave functional block 121. The first slave functional block 121 sends a response signal RF1 based on receiving the dummy command DF3. In response to receiving the response signal RF1 from the first slave functional block 121, the system manager 130 may recognize that the processing of all the commands generated by the first master functional block 111 is complete. Then, the system manager 130 may reset the first master functional block 111 whose operation is stopped.

According to the above-described exemplary embodiments, when the operation of any one functional block (e.g., an IP block) in a bus system is stopped, commands remaining in the bus system can be cleared so as not to cause problems to other parts of the bus system. Also, the functional block whose operation is stopped in the bus system can be selectively reset without causing problems to the entire bus system 1.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for streamlining the disclosure. This disclosure is not to be interpreted as reflecting an intention that the claimed embodiments require more features than are expressly recited in each claim. Rather, as the following claims reflect, inventive subject matter may be directed to less than all the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A bus system, comprising:
  a slave functional block provided with a first bus protector dedicated to the slave functional block;
  a master functional block that transmits a first command to the slave functional block;
  a bus connecting the master functional block and the slave functional block;
  a system manager, separated from the slave functional block and from the first bus protector, that resets the slave functional block when the first command does not exist on the bus and the slave functional block is in a first state of not being able to receive the first command or not being able to transmit a response signal corresponding to the first command, and
  a counter that determines whether a number of first commands transmitted to the slave functional block is the same as a number of dummy signals received from the slave functional block,
  wherein the first bus protector receives the first command on behalf of the slave functional block and transmits a dummy signal corresponding to the first command to the master functional block, when the slave functional block is in the first state.

2. The bus system of claim 1, wherein, when the first command is a read command, the first bus protector transmits a dummy signal including dummy data and a dummy response to the master functional block.

3. The bus system of claim 1, wherein, when the first command is a write command, the first bus protector transmits a dummy signal including a dummy response to the master functional block.

4. The bus system of claim 1,
  wherein the system manager determines that the slave functional block is in the first state when the system manager does not receive a response signal from the slave functional block within a predetermined amount of time after the system manager transmits a check signal to the slave functional block.

5. The bus system of claim 4, wherein the system manager transmits a second command for stopping an additional generation of the first command for the slave functional block to the master functional block, when the system manager determines the slave functional block is in the first state.

6. The bus system of claim 1,
  wherein the counter transmits first information indicating that the first command does not exist on the bus to the system manager, when the counter recognizes that the number of first commands transmitted to the slave functional block is the same as the number of dummy signals received from the slave functional block.

7. The bus system of claim 6, wherein the system manager recognizes that the first command does not exist on the bus when the first information is received.

8. The bus system of claim 1, wherein the system manager recognizes that the first command does not exist on the bus when a predetermined amount of time elapses after the master functional block transmits the first command to the slave functional block.

9. The bus system of claim 1, wherein the master functional block includes a second bus protector which generates (N-M) dummy commands, where N is a natural number greater than 1 and M is a natural number smaller than N, and
  wherein the second bus protector transmits the (N-M) dummy commands to the slave functional block, when an operation of the master functional block is stopped after transmitting an M-th command to the slave functional block.

10. The bus system of claim 9,
  wherein the system manager resets the master functional block when the second bus protector receives signals corresponding to the (N-M) dummy commands from the slave functional block.

11. A bus system, comprising:
  a bus to which a plurality of functional blocks are connected;
  a counter; and
  a system manager separated from the plurality of functional blocks,
  wherein the plurality of functional blocks includes a first functional block including a first protector, and a second functional block,
  wherein the second functional block generates and transmits a first command to the first functional block,
  wherein the system manager resets the first functional block when an operation of the first functional block is stopped and the first command does not exist on the bus,
  wherein the system manager resets the second functional block when an operation of the second functional block is stopped and the second functional block receives a first response corresponding to the first command,
  wherein the counter determines whether a number of first commands transmitted to the first functional block is the same as a number of dummy signals received from the first functional block, and
  wherein the first bus protector receives the first command on behalf of the first functional block and transmits a dummy signal corresponding to the first command to the second functional block, when the first functional block is in a first state.

12. A bus system, comprising:
a first slave functional block provided with a first bus protector dedicated to the first slave functional block;
a second slave functional block provided with a second bus protector dedicated to the second slave functional block;
a master functional block that transmits a first command to the first slave functional block and transmits a second command to the second slave functional block; and
a system manager, separated from the first slave functional block and the second slave functional block and from the first bus protector and from the second bus protector, that controls the first slave functional block, the second slave functional block, and the master functional block,
a counter that determines whether a number of first commands transmitted to the first slave functional block is the same as a number of dummy signals received from the first slave functional block,
wherein the first bus protector receives the first command on behalf of the first slave functional block,
wherein the first bus protector transmits a first dummy signal corresponding to the first command to the master functional block, when the first slave functional block is in a first state of not being able to receive the first command or not being able to transmit a response signal corresponding to the first command,
wherein the system manager generates and transmits a third command for stopping an additional generation of the first command to the master functional block, when the first slave functional block is in the first state,
wherein the system manager resets the first slave functional block when the first command does not exist on the bus and the first slave functional block is in the first state, and
wherein the second slave functional block transmits a response signal corresponding to the second command to the master functional block.

13. The bus system of claim 12, wherein the first dummy signal includes dummy data and a dummy response, when the first command is a read command.

14. The bus system of claim 12, wherein the first dummy signal includes a dummy response, when the first command is a write command.

15. The bus system of claim 12, wherein, when the second slave functional block is in a second state of being able to receive the second command or being able to transmit a response signal corresponding to the second command, the second bus protector does not generate a second dummy signal corresponding to the second command.

16. The bus system of claim 12, further comprising:
a bus connecting the master functional block and the first slave functional block and second slave functional block.

17. The bus system of claim 16, further comprising:
a counter that transmits first information indicating that the first command does not exist on the bus to the system manager, when the counter recognizes that a number of first commands transmitted to the first slave functional block is the same as a number of dummy signals received from the first slave functional block.

18. The bus system of claim 17, wherein the system manager recognizes that the first command does not exist on the bus when the first information is received.

19. The bus system of claim 16, wherein the system manager recognizes that the first command does not exist on the bus when a predetermined amount of time elapses after transmitting the first command to the slave functional block.

* * * * *